United States Patent [19]
Cink et al.

[11] Patent Number: 5,948,072
[45] Date of Patent: Sep. 7, 1999

[54] METHOD AND APPARATUS FOR DEFINING THE SCOPE OF A CORBASERVICES FACTORY FINDER

[75] Inventors: Kimberly Ann Cink, Rochester, Minn.; Russell Ley Newcombe, Round Rock, Tex.

[73] Assignee: International Business Machines Corporation, Armonk, N.Y.

[21] Appl. No.: 08/741,729

[22] Filed: Oct. 31, 1996

[51] Int. Cl.[6] .................................................. G06F 17/30
[52] U.S. Cl. ........................................................ 709/304
[58] Field of Search ............................................. 395/684

[56] References Cited

U.S. PATENT DOCUMENTS

| | | | |
|---|---|---|---|
| 5,481,721 | 1/1996 | Serlet et al. | 395/683 |
| 5,511,197 | 4/1996 | Hill et al. | 395/683 |
| 5,586,260 | 12/1996 | Hu | 709/203 |
| 5,638,504 | 6/1997 | Scott et al. | 707/530 |
| 5,642,511 | 6/1997 | Chow et al. | 395/701 |
| 5,724,588 | 3/1998 | Hill et al. | 395/684 |
| 5,802,367 | 9/1998 | Held et al. | 395/685 |
| 5,848,273 | 12/1998 | Fontana et al. | 395/701 |

*Primary Examiner*—Tariq R. Hafiz
*Assistant Examiner*—John Q. Chavis
*Attorney, Agent, or Firm*—David A. Mims, Jr.

[57] ABSTRACT

A method and apparatus for controlling a scope of location for a FactoryFinder object used by a program to find a factory object which is used to create another object in an object-oriented system. The scope of location may be a specific machine, all machines within a work group, all object server processes running under a particular operating system, etc. An abstract location interface is provided which is subclassed to provide a location object. The location object provides methods for returning a list of servers, for returning a boolean value of TRUE or FALSE for a specific server, and for creating a new location object and registering servers that result from an intersection/union of the servers registered with the current location and another location.

12 Claims, 8 Drawing Sheets

METHOD AND APPARATUS FOR DEFINING THE SCOPE OF A CORBASERVICES FACTORY FINDER

CROSS REFERENCE TO RELATED APPLICATIONS

This application is related in subject matter to the following applications filed concurrently herewith and assigned to a common assignee:

Application Ser. No. 08/741,728 filed by Kimberly Cink and Russell Newcombe entitled, "Method and Apparatus For Incorporating Policies In Searches For Factory Objects" (IBM Docket AT9-96-010), now U.S. Pat. No. 5,787,438.

Application Ser. No. 08/741,730 filed by Kimberly Cink and Russell Newcombe entitled, "Method and Apparatus For An Improved Specialization of A CORBAservices GenericFactory" (IBM Docket AT9-96-011).

Application Ser. No. 08/616,116 filed by Kimberly Cink and Russell Newcombe entitled, "Method and System For Data Filtering Within An Object-Oriented Data Processing System" (IBM Docket AT9-96-012).

The foregoing co-pending applications are incorporated herein by reference.

FIELD OF THE INVENTION

The present invention relates to data processing systems, and more particularly, to defining the scope of a Factory Finder object in an object-oriented programming environment using a Location object.

BACKGROUND OF THE INVENTION

The development of application and system software for data processing systems has traditionally been a time-consuming and somewhat repetitive task, with software developers often having to write or rewrite code to perform well-known user interface and system functions in addition to writing the code utilized to implement the desired new functionality. Recently, object-oriented programming (OOP) has emerged as a dominant new programming paradigm that enables the rapid development and implementation of functionality while permitting the customization and reuse of objects.

The power of OOP as a software development philosophy is realized chiefly through object frameworks, which provide a collection of base object classes that can be selectively utilized by a system developer to create a software system, much like a hardware developer might construct a desktop computer from standard hardware components. Object frameworks are particularly advantageous when utilized within a distributed computing environment in which multiple, possibly heterogeneous, computer systems are interconnected to allow system hardware and software resources to be shared between computer systems. In order to permit programs written in multiple diverse languages to utilize object classes defined within a single object framework, it is necessary to develop a minimum level of object standardization, thereby enabling, at least to some degree, the interoperability of object-oriented software. One organization that is working to establish industry guidelines and object management specifications to provide a common object framework for application development is the Object Management Group (OMG). The specifications promulgated by OMG enable the reusability, portability, and interoperability of object-based software in heterogeneous distributed computing environments (HDCE). An example of a commercially available object framework that conforms to OMG specifications is the Distributed System Object Model (DSOM), which is described, for example, in the "SOM Objects Toolkit version 3.0 Programmer's Guide, Volume 1: SOM and DSOM", available from International Business Machines Corporation.

The Object Management Group (OMG) defines an industry standard for Life Cycle Services in "CORBAservices: Common Object Services Specification", OMG Document No. 95-3-31. Within the OMG Life Cycle Services standard, a number of object-oriented programming interfaces are defined in support of the creation and destruction of objects within a heterogeneous distributed computing environment (HDCE). Among the interfaces introduced within the OMG Life Cycle Services standard is the FactoryFinder interface, which provides a standard service that can be utilized by applications to locate a Factory object (i.e., an object that is used to create instances of other objects) within the heterogeneous distributed computing environment (HDCE).

The OMG FactoryFinder interface introduces an operation called find_factories, which returns an Interface Definition Language (IDL) sequence of Factory objects that satisfy input criteria specified within a factory_key input parameter. In heterogenous distributed data processing systems that contain hundreds or thousands of objects, of which many may satisfy a particular factory_key, the number of Factory objects returned in the sequence can be large. Consequently, the user may desire to restrict the scope of the FactoryFinder find_factory method to a specific set of servers in order to control which factory objects are returned.

Although controlling the behavior of the FactoryFinder method by restricting activities to a specific location scope is highly desirable, the OMG specifications do not define a standard interface which enables a user to specify a location scope. Although location scope may be encapsulated within a FactoryFinder object, each FactoryFinder object would have to have a unique implementation, and modifying the scope at runtime would not be a simple matter. Consequently, it would be desirable to provide an interface capable of defining a location scope, and more particularly, an interface compatible with the OMG FactoryFinder interface that may be used as the scope of FactoryFinder operations. It is also desirable to be able to associate a location object with a FactoryFinder object, or any number of FactoryFinder objects, in order to enforce a location scope for the behavior of the FactoryFinder object or objects.

SUMMARY OF THE INVENTION

This invention relates to a method and apparatus for controlling a scope of location for a FactoryFinder object. FactoryFinder objects provide a standard way for a program to find a factory object which is used to create another object in an object-oriented system. The scope of location may be a specific machine, all machines within a work group, all object server processes running under a particular operating system, etc. An abstract location interface is provided which can be subclassed to provide a location object. The abstract location interface is inherited by all other location interfaces. The abstract interface introduces a method that is used to return all the servers within the scope defined by the location object. The location object, at a minimum, provides methods for returning a list of servers indicating the full scope of the location, for returning a boolean value of TRUE or FALSE for an inquiry about a specific server, and for creating a new location object and registering servers that result from an intersection/union of the servers encapsulated by the current location and another location.

DETAILED DESCRIPTION OF THE EMBODIMENTS

This invention provides a method and apparatus for a Location object contained within an Object Management Group (OMG) FactoryFinder object. Location objects are used to define the scope of location within which an object exists. To a user, the scope of locations may be a specific machine, all the machines within a work group, all object server processes running under a particular operating system, etc. To a distributed object system, a location is a very specific concept, directly tied to the Object Request Broker (ORB) implementation for the system. For example, a particular ORB might define the location where an object exists as an object server process identified by a particular unique implementation identifier. It is the job of the location object to bridge the gap between the user's idea of location, and the distributed object systems' idea of location. For example, a location object might be used to define all of the machines in a work group (user's view), while also being able to provide a list of all of the unique implementation identifiers for all of the object server processes that exist within that scope (distributed object system's view). The invention will now be described in further detail using FIGS. 1–9.

Figure 1:
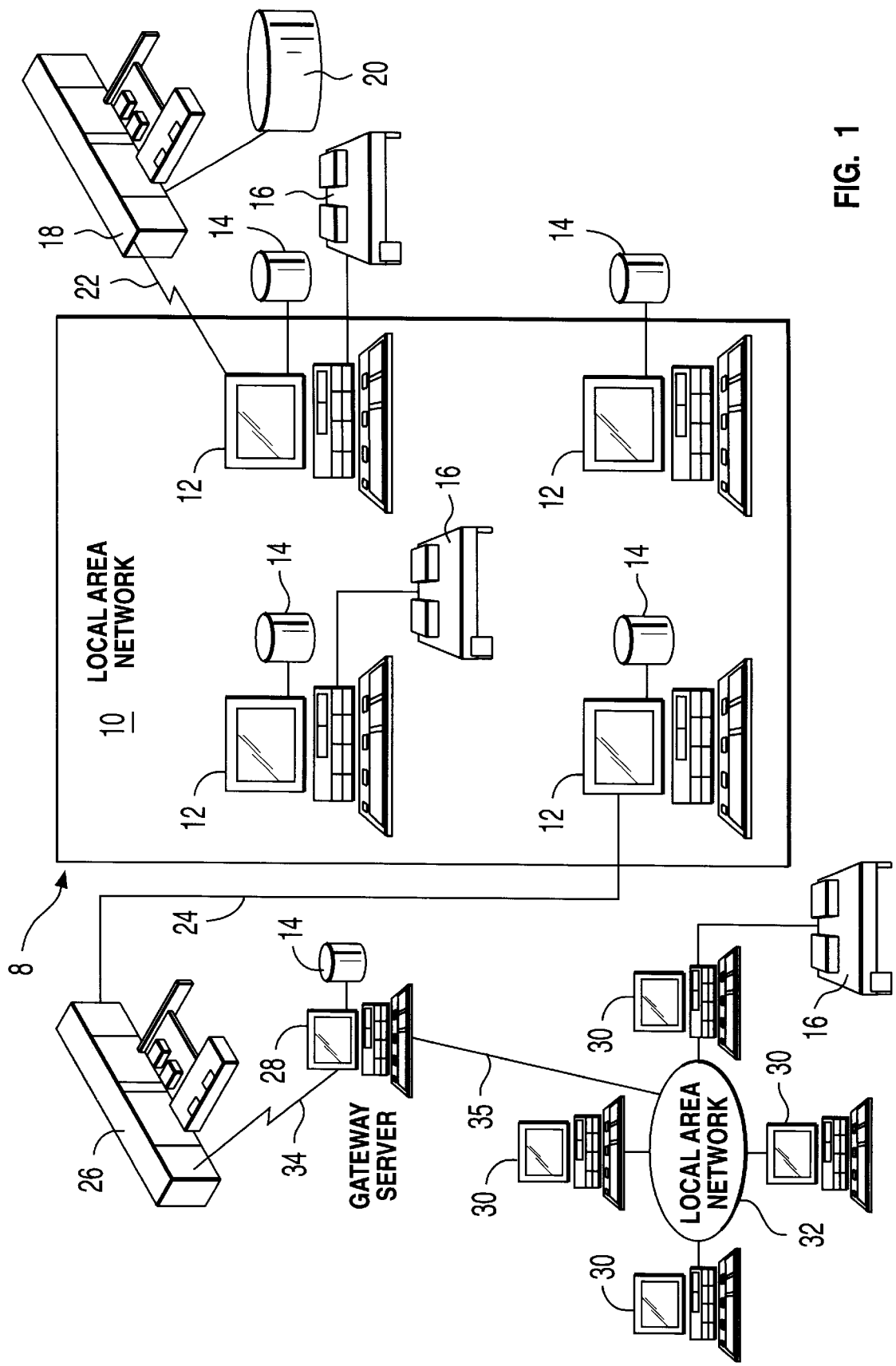
FIG. 1 is an illustrative embodiment of a heterogeneous distributed data processing system in accordance with the present invention.

A representative hardware environment where this invention may be practiced is depicted in FIG. 1, which illustrates a pictorial representation of a distributed data processing system 8. As illustrated, data processing system 8 contains a plurality of networks, including local area networks (LAN) 10 and 32, each of which preferably includes a plurality of individual computers 12 and 30, respectively. One skilled in the art will appreciate that a plurality of workstations coupled to a host processor may be utilized for each such network. As is common in such data processing systems, each computer 12 and 30, may be coupled to a storage device 14, and a printer 16.

Data processing system 8 further includes one or more mainframe computers, such as mainframe computer 18, which may be preferably coupled to LAN 10 by means of a communication link 22. Mainframe computer 18 is preferably coupled to a storage device 20, which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As understood by one skilled in the art, data processing system 8 additionally includes unillustrated gateways, routers, bridges, and various other network hardware utilized to interconnect the segments of data processing system 8.

Figure 2:
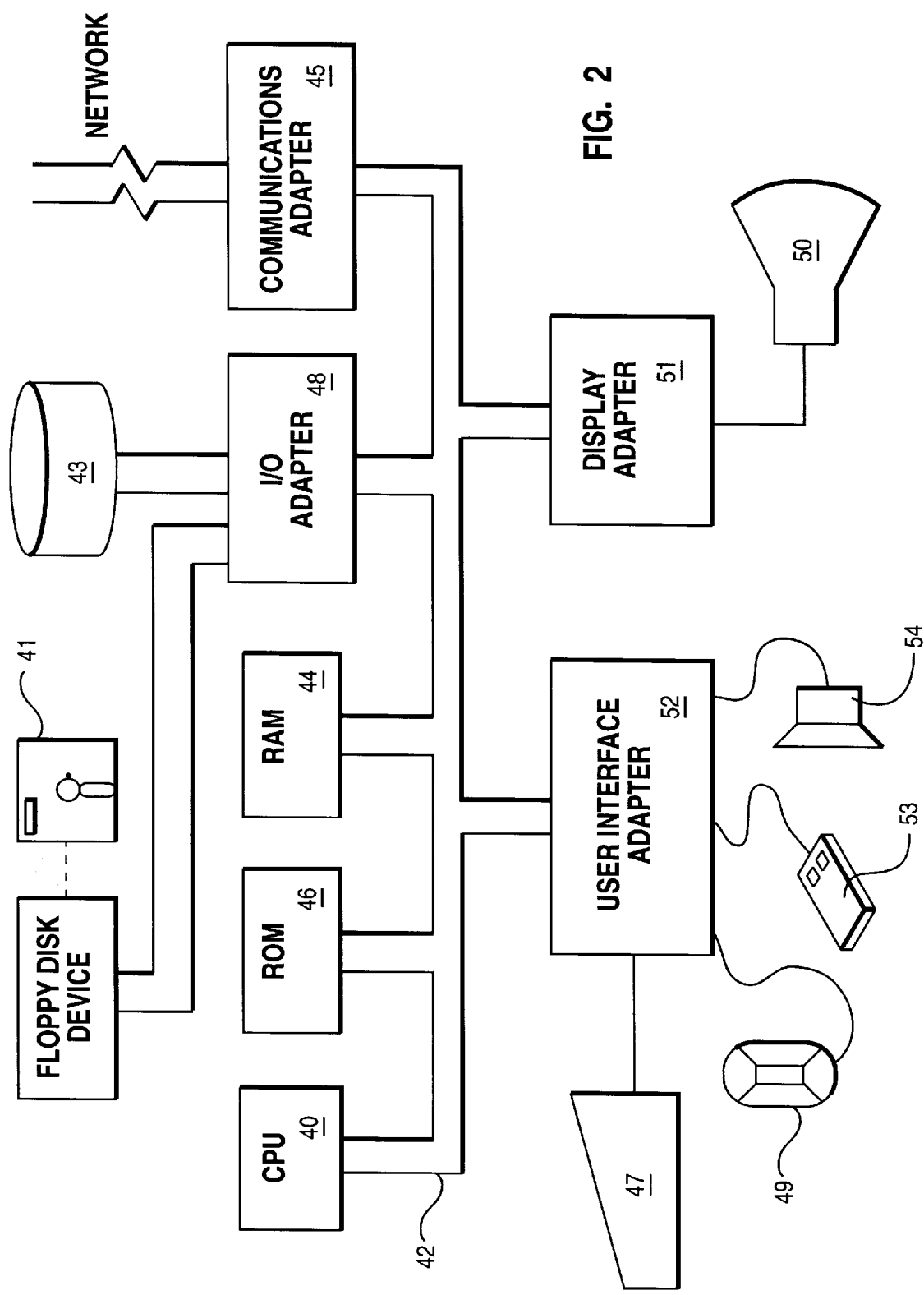
FIG. 2 is a block diagram of a computer/workstation within the distributed data processing system in FIG. 1.

Referring now to FIG. 2, there is shown a pictorial representation of a workstation, having a central processing unit 40, such as a conventional microprocessor, and a number of other units interconnected via a system bus 42. The workstation shown in FIG. 2, includes a Random Access Memory (RAM) 44, Read Only Memory (ROM) 46, an I/O adapter 48 for connecting peripheral devices such as disk unit 43 to the bus, a user interface adapter 52 for connecting a keyboard 47, a mouse 53, a speaker 54, a microphone 49, and/or other user interface devices such as a touch screen device (not shown) to the bus, a communication adapter 45, for connecting the workstation to a data processing network and a display adapter 51, for connecting the bus to a display device 50. The workstation, in the preferred embodiment, has resident thereon the OS/2 operating system and the computer software making up this invention which is included as a toolkit. One skilled in the art will appreciate that the procedures of this invention may be in the form of a computer program product on a computer readable medium, which may be temporarily or permanently loaded on the workstation in disk storage 43, floppy diskette 41, or RAM 44.

Figure 3:
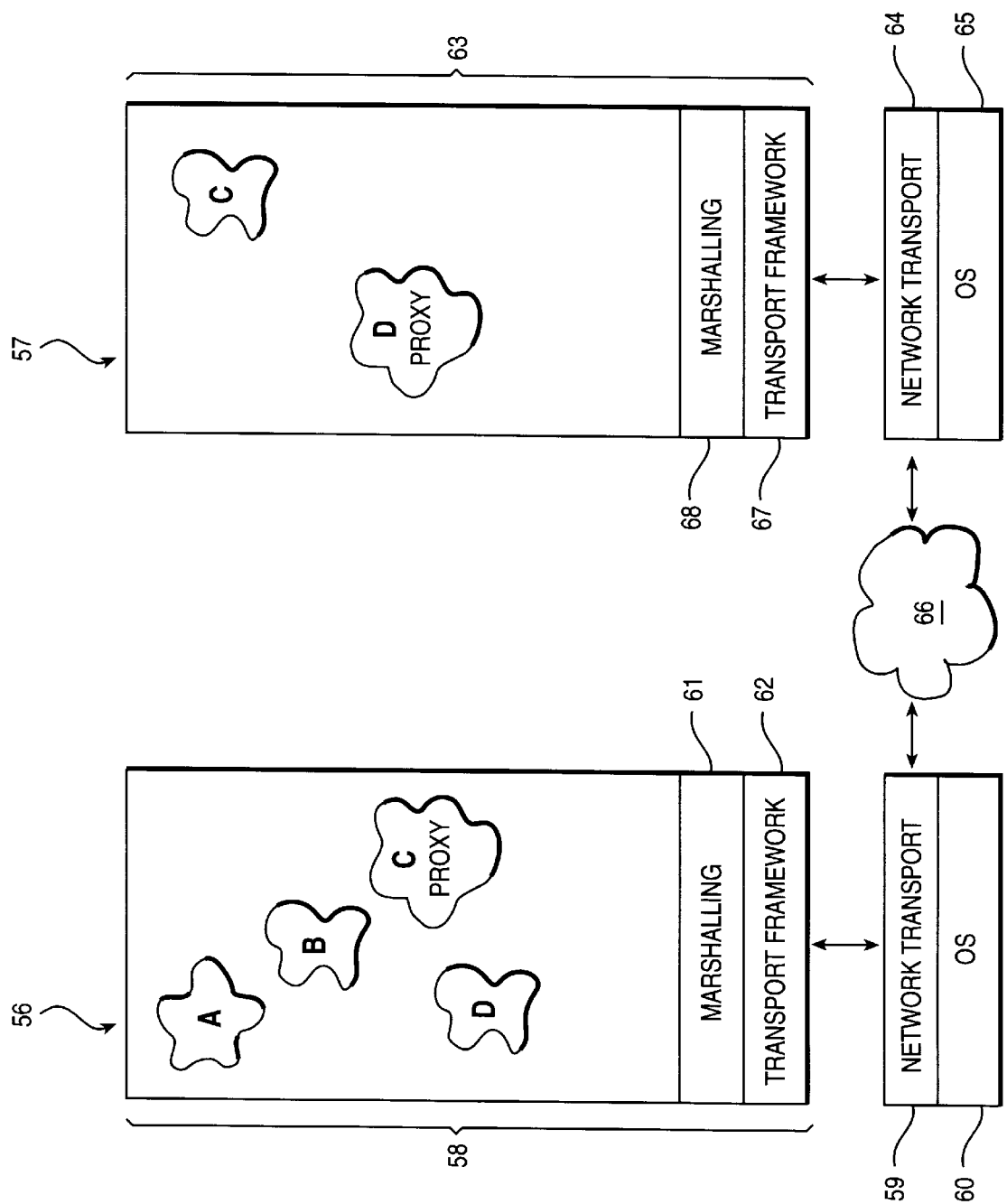
FIG. 3 is a pictorial representation of the generalized software configuration of two nodes within a heterogeneous distributed object-oriented computing environment.

With reference now to FIG. 3, there is illustrated a pictorial representation of the generalized software configuration of two nodes 56 and 57 within a heterogeneous distributed computing environment (HDCE), such as data processing system 8. As illustrated, nodes 56 and 57, which can comprise two of computers 12 within data processing system 8, execute software under the control of possibly diverse operating systems 60 and 65, respectively. Although diverse operating systems may be utilized by nodes 56 and 57, intercommunication between nodes 56 and 57 via network 66 is facilitated by network transport layers 59 and 64, which can comprise Transport Control Protocol/Interface Program (TCP/IP), for example. The software configurations of nodes 56 and 57 further comprise a distributed object environment 58 and 63 including objects A, B, C, and D. To illustrate the interaction of objects A–D within distributed object environment 58 and 63, assume that object A invokes a method on objects B, and C, passing object D as a parameter, and that objects B and C belong to the same class. If object A calls object B, a local object, all of the interaction between objects A, B, and D occurs within the same local process and is controlled strictly by the dispatching and reference mechanisms of the local process. On the other hand, if object A calls object C, a remote object, the call is directed to object C proxy, which interacts with marshalling code 61 and transport framework 62 to package the call parameters into a message having a format suitable for transmission over network 66. In response to receipt of the message at node 57, network transport 64 passes the message to transport framework 67 and marshalling code 68, which demarshals the parameters to reconstruct the call of object C. Thereafter, an object D proxy is created and object C is called in the same manner as if object C was local to object A. Any requests from object C to object D are similarly handled through object D proxy. As can be seen from this description of a distributed object environment, an object can transparently interact with other objects within the distributed object environment without regard to whether the other objects reside at a local or remote node or whether the objects are within the same process.

Figure 4:
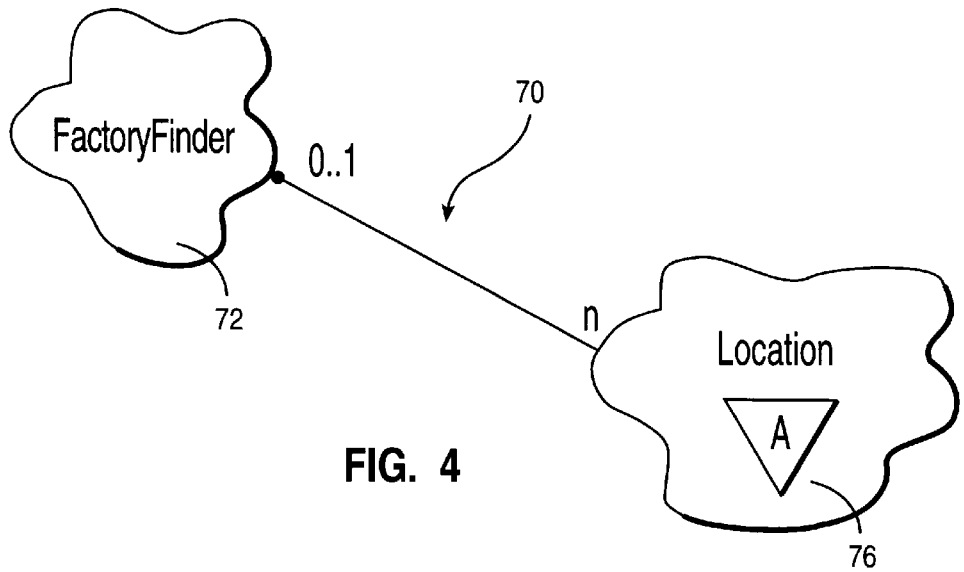
FIG. 4 depicts a class diagram illustrating the class relationship between an OMG FactoryFinder object and a Location object.

Referring now to FIG. 4, there is shown an association 70 between a FactoryFinder object 72 and a Location object 76. The FactoryFinder object 72, contains "zero" or "one" Location object 76. The Location object 76, may be contained by any number ("zero" to "N") of FactoryFinder objects 72. The Location interface is abstract and is designed to be subclassed.

Figure 5:
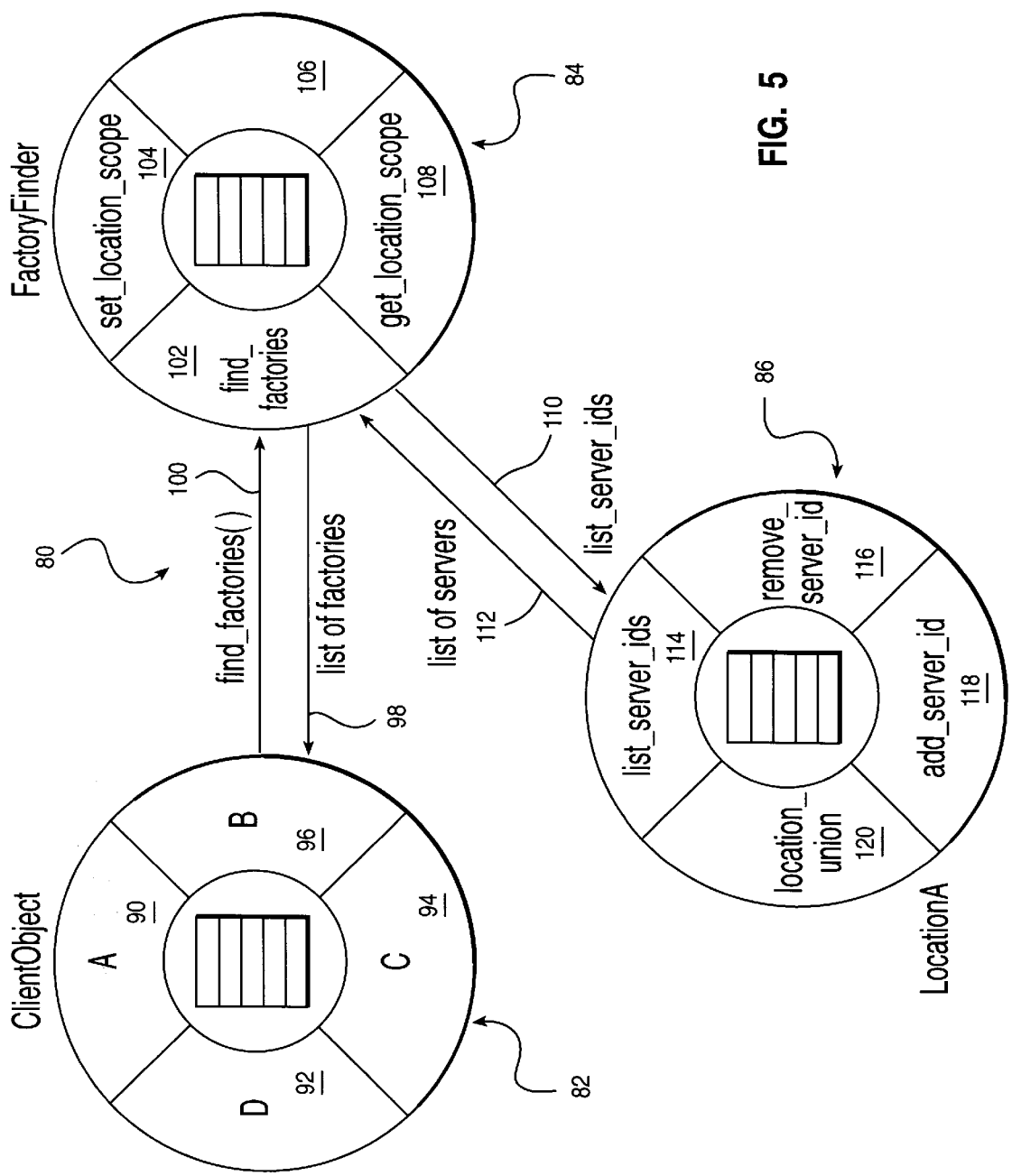
FIG. 5 illustrates a pictorial representation for accessing a Location object by a Client object from a FactoryFinder object when a Client object invokes the find_factories method on a FactoryFinder object.

With reference to FIG. 5, there is shown a diagram 80 illustrating the flow between objects when a ClientObject 82 invokes a find_factories method 100, on a FactoryFinder object 84 that has a LocationA object 86 registered with it. The Client Object 82 invokes the find_factories method 100 on the FactoryFinder object 84. The FactoryFinder object 84, invokes the list_server_ids method 110 on the LocationA object 86, which is a location object that is registered with the FactoryFinder object 84, via the set_location_scope method 104. LocationA object 86, returns the list of servers 112 that it represents to the FactoryFinder object 84. The FactoryFinder object 84, searches for factory objects that match the specification provided by the ClientObject 82. Only factory objects that reside on a server returned by the LocationA object 86 are considered (those returned by 112). A list of factories 98 that reside with the location scope of LocationA 86, and meet the client requirements are returned to the ClientObject 82 by the FactoryFinder object 84.

Figure 6:
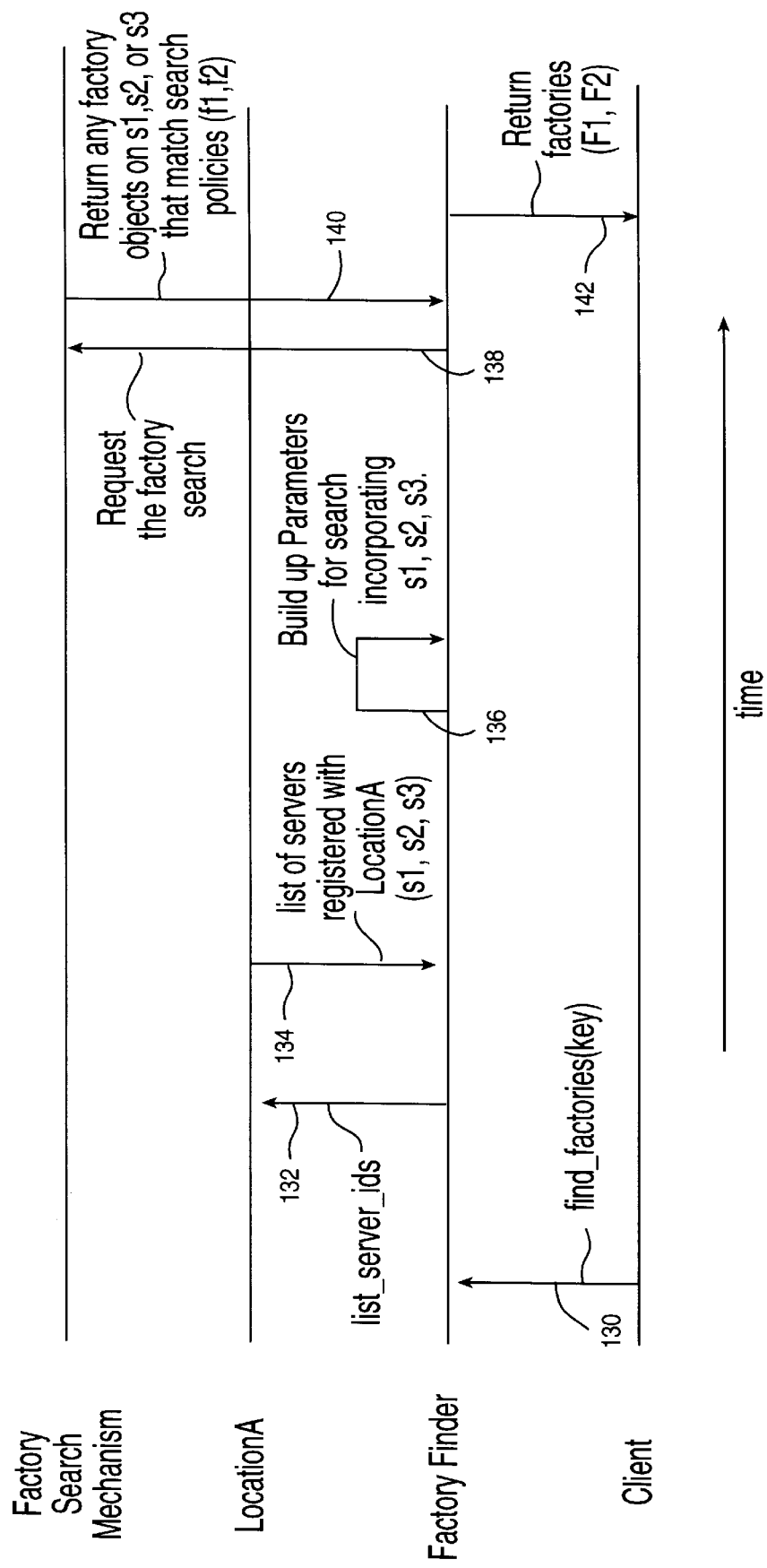
FIG. 6 illustrates a sequence diagram illustrating how a FactoryFinder object utilizes a Location object to control the scope of its methods.

Turning now to FIG. 6, there is shown a sequence diagram illustrating how a FactoryFinder object utilizes a Location object to control the scope of its methods. The FactoryFinder object find_factories method is restricted to the scope boundaries as set by the Location object registered with it. For the purpose of this invention, registration means "contained by". As a result of the restriction, the find_factories method will only consider factory objects that are able to create object instances on the server registered with the Location object. With reference to FIG. 6, a ClientObject invokes the find_factories 130 method on a FactoryFinder object that has a Location object registered with it. The find_factories method passes in a Key parameter that specifies the type of object to create, as well as various other pertinent pieces of information relative to the factory search, depending on the implementation of the FactoryFinder. The FactoryFinder invokes the list_server_ids method 132, on the LocationA object registered with it in order to obtain a list of servers 134, that define the scope of the find_factories operation. The FactoryFinder performs any internal processing necessary to build up parameters 136 for the factory search incorporating the location information retrieved. The FactoryFinder object interacts with the search vehicle 138, passing in the required parameters, in order to locate the factories that meet the requirements. The Factory search mechanisms return the factories located 140 to the FactoryFinder object. In this diagram, two factory objects (f1, f2) are found within the location scope boundaries that met all of the ClientObject's requirements. The two factory objects are returned to the client 142 to satisfy the ClientObject's requirement by the FactoryFinder object.

Figure 7:
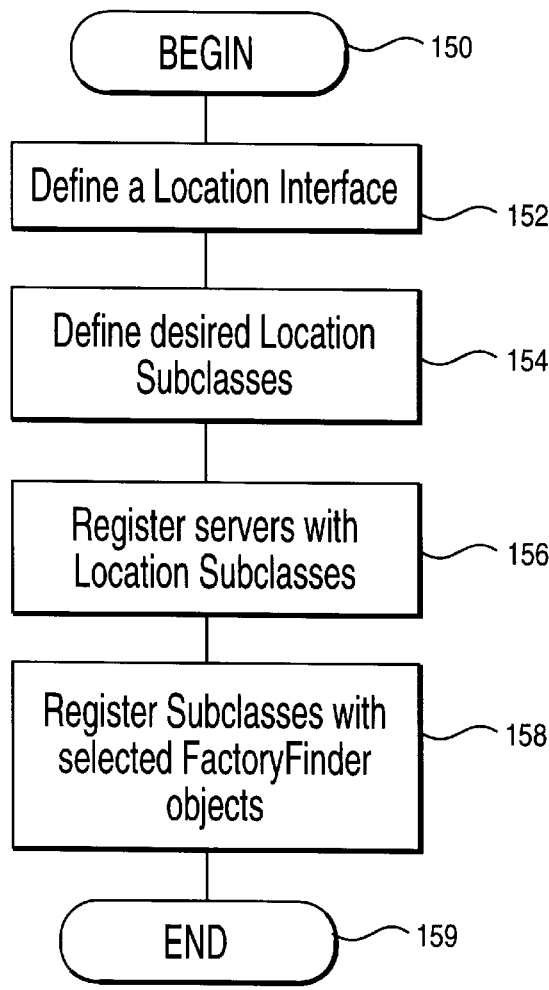
FIG. 7 is a flow diagram for defining a Location object and using it to define the location scope for various FactoryFinder objects.

Referring now to FIG. 7, there is shown a flow diagram for defining a Location object and using it to define the location scope for various FactoryFinder objects. The procedure begins at step 150, and proceeds immediately to block 152, where the procedure defines an abstract Location object with the standard behaviors that will be common to all subclasses of location. No implementation details needs to exist at this level since most of the logic will reside at the subclass level. At block 154, subclasses of the abstract location are defined in order to provide an implementation for the various server representations that exist in the environment. For example, there may be a subclass that defines server IDs as strings, while another subclass may deal with server representations as objects. At block 156, servers are registered with the location subclasses in order to define the scope of each location. The registration process associates the scope with a Location object, but as appreciated by one skilled in the art, there are many other options available other then registration that may be defined by the implementer. The central point of the registration process is that a mechanism exists that sets the scope of the location subclass such that the location subclass will be able to list the servers identified as its' scope. At block 158, the location subclass is registered with a FactoryFinder object in order to define the scope for various activities performed by the FactoryFinder object. A location subclass may be registered with any number of FactoryFinder objects.

Figure 8:
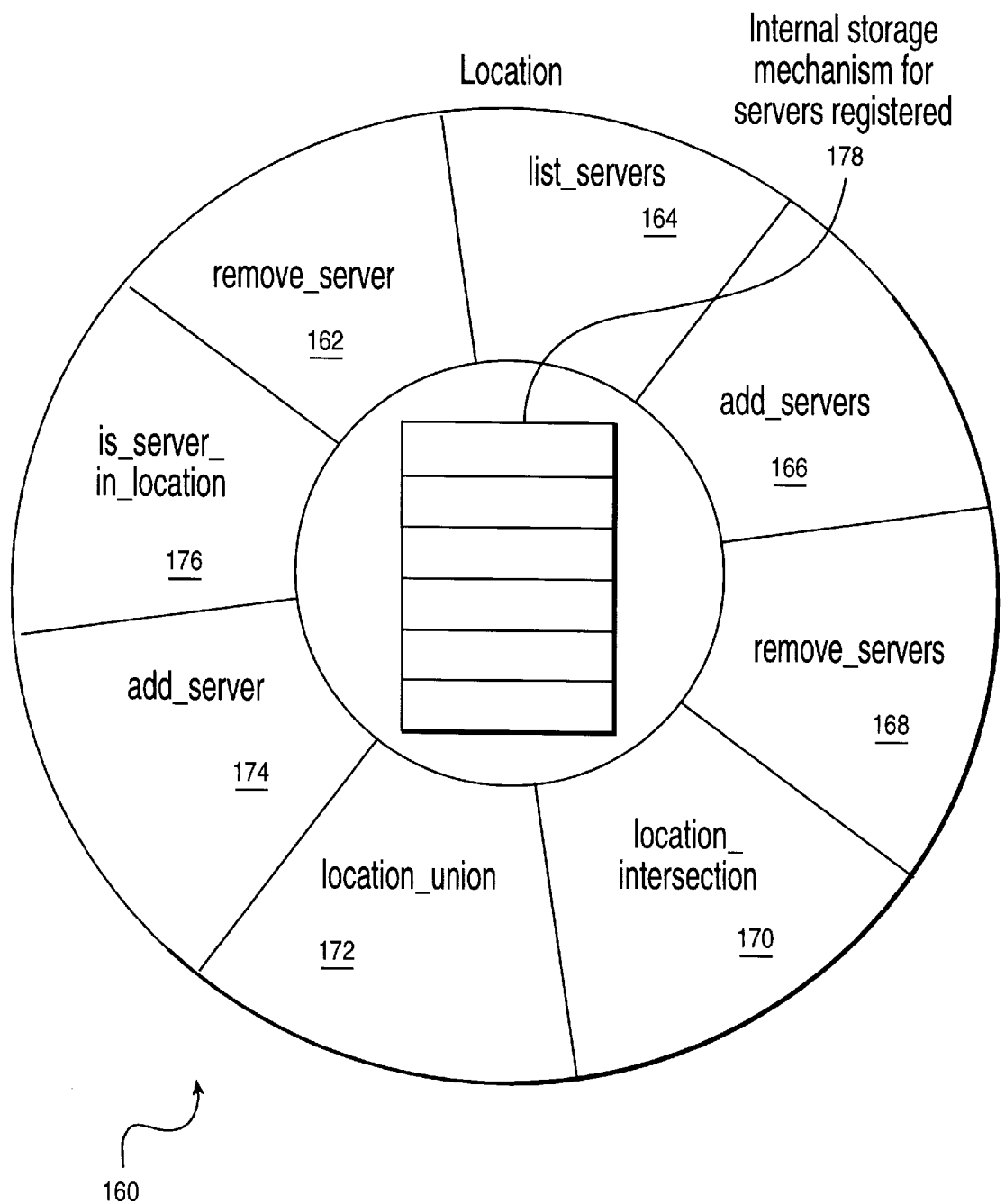
FIG. 8 is a Location object illustrating the potential methods in the Location object.

Turning now to FIG. 8, there is shown a Location object 160 and the characteristics that are desirable in a Location object that uses a registration mechanism to define servers as part of the scope of the location subclass. The internal storage mechanism 178, utilized by the Location object 160 to maintain the list of servers with the Location object is implementation specific and will be defined by the specialized subclasses. For example, server identifications for one location subclass may be represented as strings, and another by objects. The methods defined in FIG. 8 are general to all of the subclasses utilizing a registration mechanism. However, the methods may be defined at the abstract level and implemented at the subclass level. An example of the methods for a Location object 160 utilizing a registration mechanism are as follows:

1) list_servers 164: This method returns a list of servers registered with the Location object.

2) add_server 174: This method registers the server passed in with the Location object.

3) remove_server 162: This method terminates the registered status of the server passed in to the Location Server 160.

4) add_servers 166: This method registers the group of servers specified with the Location Object 160.

5) remove_servers 168: This method terminates the registration status of the group of servers specified.

6) is_server_in_location 176: This method returns a boolean value of TRUE if the specified server is registered with the Location Object 160, and a boolean value of FALSE if it is not.

7) location_union 172: This method creates a new Location object, and registers the servers that are the result of a union of the servers registered with the current location and another location, as specified by the user.

8) location_intersection 170: This method creates a new Location object, and registers the servers that are the result of an intersection of the servers registered with the current location and another location, as specified by the user.

As appreciated by one skilled in the art, additional methods may be added to the Location object 160, depending on the environment structure and the needs of the users.

Figure 9:
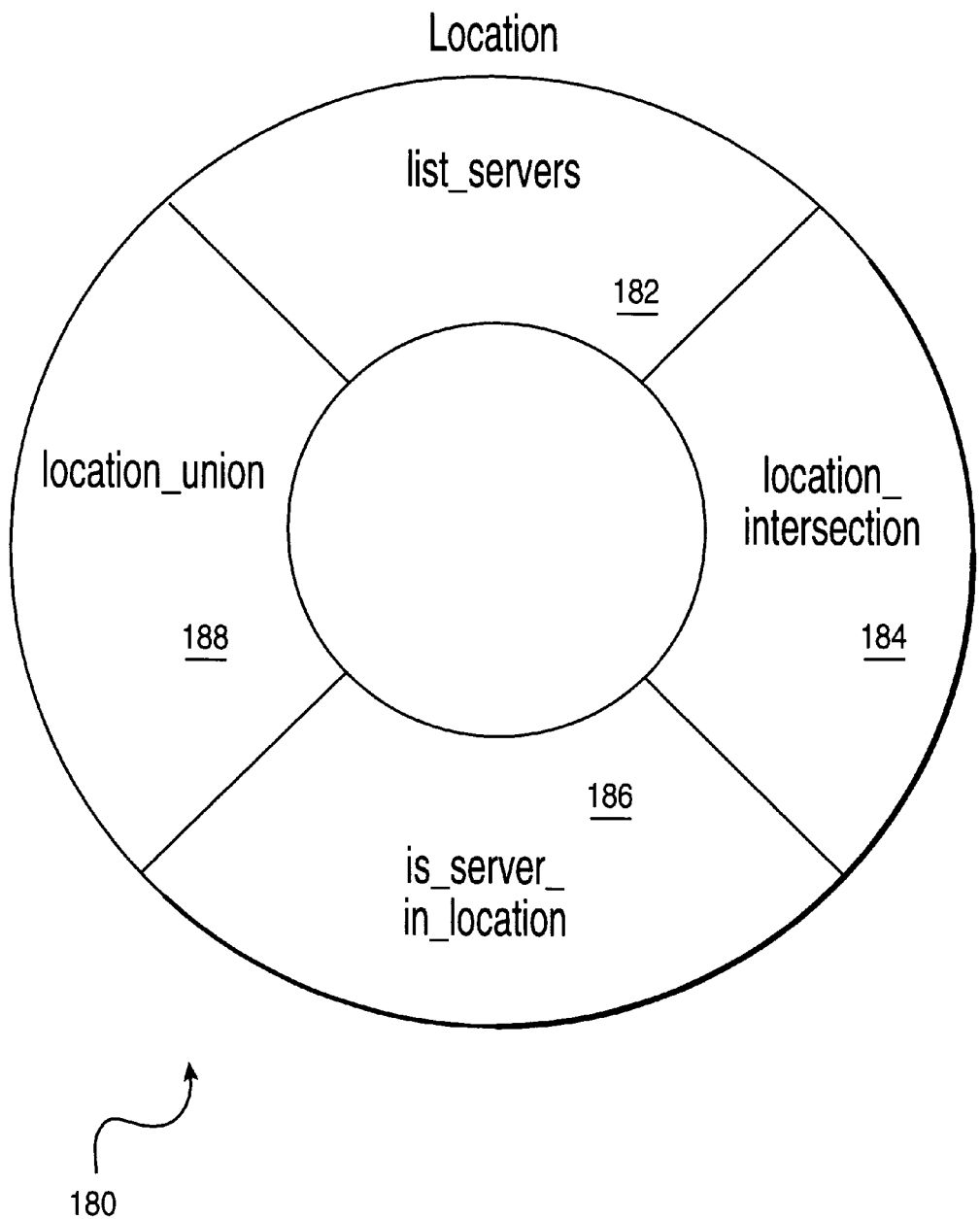
FIG. 9 is a Location object illustrating the basic characteristics (minimum) of the Location object.

Referring now to FIG. 9, there is illustrated the basic characteristics of a Location object 180, containing the minimum set of methods regardless of whether a registration mechanism is utilized. All location objects should provide, at a very minimum, a listing mechanism such as the list_servers method 182, that indicates to the caller the location scope of the Location object 180. Other convenience methods such as location_union 188, location_intersection 184, and is_server_in_location 186 are useful for providing information to the user.

While the invention has been described with respect to a preferred embodiment thereof, it will be understood by those skilled in the art that various changes in detail may be made therein without departing from the spirit, scope, and teaching of the invention. The Location object of this invention offers a broad range of usefulness in that it may be utilized by any object that would like to restrict operations to a specified scope boundary. For example, the Location object is useful in administrative tasks since it provides administrators with a mechanism for resource control by restricting where objects can be created to the server group defined by a Location object. The ability to control the behavior of objects by utilizing a Location object to restrict method activities to a specific scope is highly desirable in large distributed environments. The concept is extremely powerful, and can be applied in a variety of ways to meet the business needs of users. Accordingly, the herein disclosed invention is to be limited only as specified in the following claims.

What we claim is:

1. A method, implemented in a computer system, for creating an interface for defining the scope for searches for object factories in an object oriented environment, comprising the steps of:

defining an abstract location object in said object oriented environment;

defining a location subclass of said abstract object having implementation logic for server representations in said object oriented environment; and associating a plurality of servers in said object oriented environment with said location subclass to set the scope of location for searches for factory objects.

2. The method of claim 1, wherein the step of associating a plurality of servers comprises the step of:

registering said plurality of servers with said location subclass.

3. The method of claim 1, wherein the step of associating a plurality of servers comprises the step of:

registering a subclass with a selected FactoryFinder object to set the scope of said FactoryFinder.

4. The method of claim 1, wherein the step of defining an abstract location object further comprises the step of:

defining a location object having a listing mechanism for said plurality of servers in said object oriented environment.

5. An apparatus for creating an interface for defining the scope for searches for object factories in an object oriented environment, comprising:

means for defining an abstract location object in said object oriented environment;

means for defining a location subclass of said abstract object having implementation logic for server representations in said object oriented environment; and means for associating a plurality of servers in said object oriented environment with said location subclass to set the scope of location for searches for factory objects.

6. The apparatus of claim 5, wherein the means for associating a plurality of servers comprises:

means for registering said plurality of servers with said location subclass.

7. The apparatus of claim 5, wherein the means for associating a plurality of servers comprises:

means for registering said subclass with a selected FactoryFinder object to set the scope of said FactoryFinder.

8. The apparatus of claim 5, wherein the means for defining an abstract location object further comprises:

means for defining a location object having a listing mechanism for said plurality of servers in said object oriented environment.

9. A computer program product having a computer readable medium having computer program logic recorded thereon for creating an interface for defining the scope for searches for object factories in an object oriented environment, comprising:

computer readable means for defining an abstract location object in said object oriented environment;

computer readable means for defining a location subclass of said abstract object having implementation logic for server representations in said object oriented environment; and computer readable means for associating a plurality of servers in said object oriented environment with said location subclass to set the scope of location for searches for factory objects.

10. The computer program of claim 9, wherein the computer readable means for associating a plurality of servers comprises:

computer readable means for registering said plurality of servers with said location subclass.

11. The computer program of claim 9, wherein the computer readable means for associating a plurality of servers comprises:

computer readable means for registering said subclass with a selected FactoryFinder object to set the scope of said FactoryFinder object.

12. The computer program of claim 9, wherein the computer readable means for defining an abstract location object further comprises:

computer readable means for defining a location object having a listing mechanism for said plurality of servers in said object oriented environment.

* * * * *